(12) United States Patent
Matsubara

(10) Patent No.: US 9,885,412 B2
(45) Date of Patent: Feb. 6, 2018

(54) POWER TRANSFER DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventor: Mitsumasa Matsubara, Anjo (JP)

(73) Assignees: AISIN AW CO., LTD., Anjo-Shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/303,686

(22) PCT Filed: Apr. 17, 2015

(86) PCT No.: PCT/JP2015/061830
§ 371 (c)(1),
(2) Date: Oct. 12, 2016

(87) PCT Pub. No.: WO2015/166821
PCT Pub. Date: Nov. 5, 2015

(65) Prior Publication Data
US 2017/0030458 A1    Feb. 2, 2017

(30) Foreign Application Priority Data
Apr. 28, 2014 (JP) ................................ 2014-092675

(51) Int. Cl.
*F16H 57/04* (2010.01)
*F16H 57/037* (2012.01)
(Continued)

(52) U.S. Cl.
CPC ....... *F16H 57/0423* (2013.01); *F16H 57/037* (2013.01); *F16H 57/04* (2013.01);
(Continued)

(58) Field of Classification Search
None
See application file for complete search history.

(56) References Cited

U.S. PATENT DOCUMENTS 1,775,623 A * 9/1930 Morgan .............. F16H 57/0483
184/13.1
1,843,070 A * 1/1932 Shoemaker ......... F16H 57/0483
184/13.1
8,371,978 B2   2/2013 Nobata et al.

FOREIGN PATENT DOCUMENTS

DE      102011003221 A1 *  8/2012  ......... F16H 57/0409
DE   10 2012 004 279 A1    5/2013
(Continued)

OTHER PUBLICATIONS

International Search Report for PCT/JP2015/061830 dated Jul. 21, 2015 [PCT/ISA/210].

*Primary Examiner* — Dirk Wright
(74) *Attorney, Agent, or Firm* — Sughrue Mion, PLLC

(57) ABSTRACT

A differential case of a differential gear has a pair of openings formed facing each other on an axis X that is orthogonal to a rotational axis of a differential ring gear. A reservoir plate (partitioning member) that partitions a space in a transmission case into a differential chamber and a working oil storage chamber has a tubular portion that surrounds a part of the differential case. The tubular portion has a discharge hole formed so as to be able to face the pair of openings as the differential case is rotated about the rotational axis.

6 Claims, 7 Drawing Sheets

(51) Int. Cl.
*F16H 48/08* (2006.01)
*F16H 3/66* (2006.01)
*F16H 45/02* (2006.01)
*F16H 61/00* (2006.01)
*F16H 48/40* (2012.01)

(52) U.S. Cl.
CPC ......... *F16H 57/0483* (2013.01); *F16H 3/663* (2013.01); *F16H 45/02* (2013.01); *F16H 48/08* (2013.01); *F16H 48/40* (2013.01); *F16H 61/0025* (2013.01); *F16H 2200/006* (2013.01); *F16H 2200/0086* (2013.01); *F16H 2200/2007* (2013.01); *F16H 2200/2046* (2013.01); *F16H 2200/2066* (2013.01); *F16H 2200/2082* (2013.01); *F16H 2200/2097* (2013.01)

(56) References Cited

FOREIGN PATENT DOCUMENTS

| | | | | |
|---|---|---|---|---|
| DE | 102012004279 A1 | * | 5/2013 | ......... F16H 57/0409 |
| JP | 59-140962 A | | 8/1984 | |
| JP | 2006-275164 A | | 10/2006 | |
| JP | 2012-220004 A | | 11/2012 | |
| JP | 2014190529 A | * | 10/2014 | ......... F16H 57/0423 |
| WO | 2011/121861 A1 | | 10/2011 | |
| WO | WO-2014156730 A1 | * | 10/2014 | ......... F16H 57/0423 |

\* cited by examiner

FIG. 2

|  |  | C-1 | C-2 | C-3 | C-4 | B-1 | B-2 | F-1 |
|---|---|---|---|---|---|---|---|---|
| D | 1st | ○ |  |  |  |  | ● | ○ |
|  | 2nd | ○ |  |  |  | ○ |  |  |
|  | 3rd | ○ |  | ○ |  |  |  |  |
|  | 4th | ○ |  |  | ○ |  |  |  |
|  | 5th | ○ | ○ |  |  |  |  |  |
|  | 6th |  | ○ |  | ○ |  |  |  |
|  | 7th |  | ○ | ○ |  |  |  |  |
|  | 8th |  | ○ |  |  | ○ |  |  |
| REV1 |  |  |  | ○ |  |  | ○ |  |
| REV2 |  |  |  |  | ○ |  | ○ |  |

※○：ENGAGED
●：ENGAGED WHEN ENGINE BRAKING IS IN OPERATION.

POWER TRANSFER DEVICE

TECHNICAL FIELD

The present disclosure relates to a power transfer device that includes a partitioning member that partitions a space in a case into a differential chamber, in which a differential ring gear and a differential gear are disposed, and a working oil storage chamber, in which working oil is stored.

BACKGROUND ART

There has hitherto been known a power transfer device that includes a reservoir plate that partitions a space in a case member that houses a speed change mechanism and a differential device (differential gear) into a differential chamber, in which the differential device is disposed, and a storage chamber, in which oil (working oil) is stored (see Patent Document 1, for example). In the power transfer device, the reservoir plate is disposed so as to cover the differential device in the case member and tightly contact the inner peripheral surface of a rib member that extends from the case member along the outer peripheral surface of a ring gear (differential ring gear) of the differential device. Consequently, in the power transfer device, a residence of oil in the differential chamber, that is, around the ring gear of the differential device, is suppressed to suppress an increase in rotational resistance of the ring gear.

RELATED-ART DOCUMENTS

Patent Documents

[Patent Document 1] International Publication WO 2011/121861

SUMMARY

In the power transfer device according to the related art described above, a notch is formed in the rib member so as to expose a part of the outer peripheral surface of the ring gear, and oil in the differential chamber raked up by rotation of the ring gear is discharged to the outside of the differential chamber via the notch to be sent to the storage chamber. However, merely providing the rib member with the notch may not sufficiently discharge oil in the differential chamber to the outside, and may not reduce the amount of oil that resides in the differential chamber to improve efficiency. Thus, the power transfer device according to the related art still has room for improvement in terms of improving the performance of discharging oil in the differential chamber.

It is therefore a main object according to the present disclosure to further improve the performance of discharging working oil from a differential chamber defined by a partitioning member.

The present disclosure provides a power transfer device including: a differential ring gear meshed with a drive pinion gear to which power from a transmission is transferred; a differential gear that includes a differential case coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein:

the differential case has a pair of openings formed facing each other on an axis that is orthogonal to a rotational axis of the differential ring gear;

the partitioning member includes a tubular portion formed so as to surround a part of the differential case;

the tubular portion has a discharge port that opens on a side in a travel direction, in a main rotational direction of the differential ring gear and the differential case, with respect to a lowermost point of the tubular portion and on an opposite side of an uppermost point of the tubular portion from the travel direction side in the main rotational direction; and the discharge port is formed in the tubular portion so as to be able to face the pair of openings as the differential case is rotated about the rotational axis.

In the power transfer device thus configured, working oil around the differential gear in the differential chamber (inside the tubular portion) is mainly raked up by the edges of the pair of openings which are formed in the differential case, as the differential ring gear and the differential case are rotated, to be discharged to the working oil storage chamber from the discharge port which is formed in the tubular portion of the partitioning member. In this way, with the power transfer device, working oil around the differential gear, which is not raked out to the outside of the differential chamber by the differential ring gear, can be discharged to the working oil storage chamber via the discharge port of the tubular portion of the partitioning member. Thus, with the power transfer device, it is possible to further improve the performance of discharging working oil in the differential chamber which is defined by the partitioning member. The phrase "main rotational direction of the differential ring gear" indicates the rotational direction of the differential ring gear at the time when a vehicle on which the power transfer device is mounted travels forward.

BRIEF DESCRIPTION OF THE DRAWINGS

FIG. 2 is an operation table that illustrates the relationship between each shift speed of an automatic transmission 25 included in the power transfer device 20 of FIG. 1 and the respective operating states of clutches and brakes.

DETAILED DESCRIPTION OF THE PREFERRED EMBODIMENT

Now, an embodiment according to the present disclosure will be described with reference to the drawings.

Figure 1:
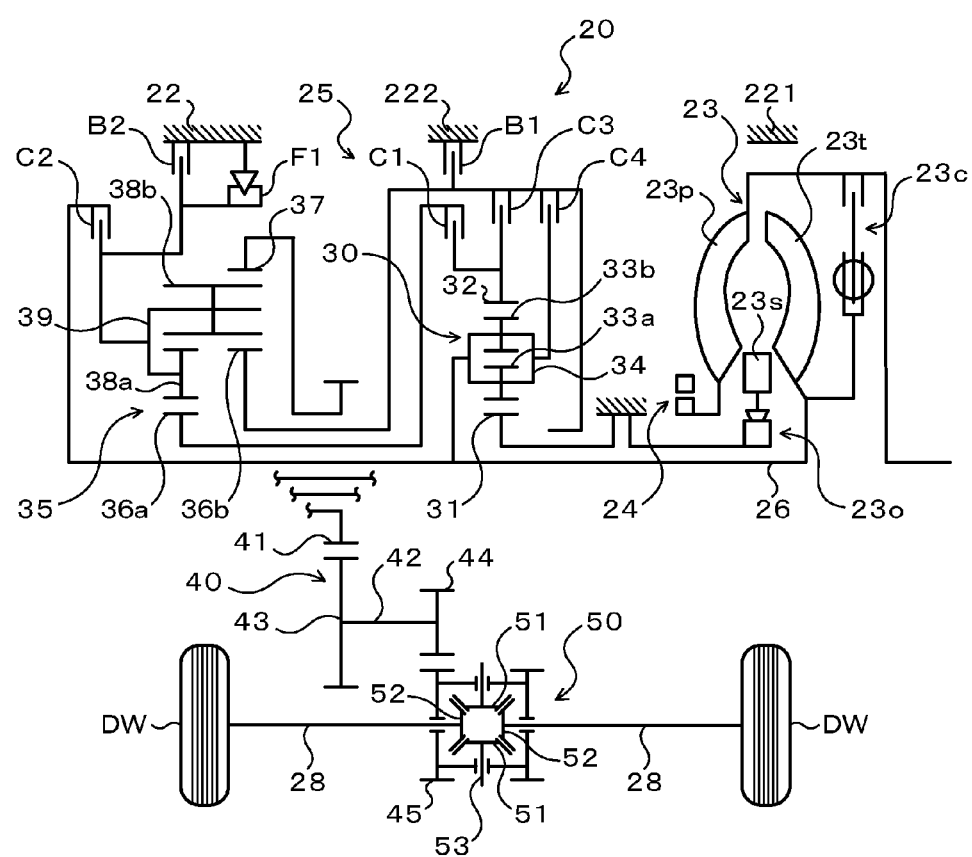
FIG. 1 is a schematic configuration diagram of a power transfer device 20 according to the present disclosure.

FIG. 1 is a schematic configuration diagram of a power transfer device 20 according to the present disclosure. The power transfer device 20 illustrated in the drawing is connected to a crankshaft of an engine (not illustrated) mounted on a front-drive vehicle, and can transfer power from the engine to left and right drive wheels (front wheels) DW. As illustrated in the drawing, the power transfer device 20 includes a transmission case 22 that includes a transaxle case 221 and a converter housing 222 coupled to the transaxle case 221, a fluid transmission apparatus (starting device) 23 housed in the converter housing 222, an oil pump 24, an automatic transmission 25 housed in the transaxle case 221, a gear mechanism (gear train) 40, a differential gear (differential mechanism) 50, and so forth.

The fluid transmission apparatus 23 is structured as a torque converter that has a pump impeller 23p on the input side connected to the crankshaft of the engine, a turbine runner 23t on the output side connected to an input shaft 26 of the automatic transmission 25, a stator 23s disposed on the inner side of the pump impeller 23p and the turbine runner 23t to rectify the flow of working oil from the turbine runner 23t to the pump impeller 23p, a one-way clutch 23o that restricts the rotational direction of the stator 23s to one direction, a lock-up clutch 23c, and so forth. It should be noted, however, that the fluid transmission apparatus 23 may be structured as a fluid coupling that does not have the stator 23s.

The oil pump 24 is structured as a gear pump that includes a pump assembly composed of a pump body and a pump cover, and an externally toothed gear connected to the pump impeller 23p of the fluid transmission apparatus 23 via a hub. The oil pump 24 is driven by power from the engine to suction working oil (ATF) stored in a working oil storage chamber 65 (see FIGS. 5 and 6) defined in the lower part of the transmission case 22 and pump the working oil to a hydraulic control device (not illustrated).

The automatic transmission 25 is structured as an eight-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33a and 33b meshed with each other, one of the pinion gears 33a and 33b being meshed with the sun gear 31 and the other being meshed with the ring gear 32. As illustrated in the drawing, the sun gear 31 of the first planetary gear mechanism 30 is fixed to the transmission case 22, and the planetary carrier 34 of the first planetary gear mechanism 30 is connected to the input shaft 26 so as to be rotatable together with the input shaft 26. In addition, the first planetary gear mechanism 30 is structured as a so-called speed reduction gear, and reduces the speed of power transferred to the planetary carrier 34 which serves as an input element to output the power from the ring gear 32 which serves as an output element.

The second planetary gear mechanism 35 includes a first sun gear 36a and a second sun gear 36b which are each an externally toothed gear, a ring gear 37 which is an internally toothed gear disposed concentrically with the first and second sun gears 36a and 36b, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels via the gear mechanism 40, the differential gear 50, and a drive shaft 28. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and mating plates, an oil chamber supplied with hydraulic oil, and so forth, and that is capable of fastening and unfastening the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and mating plates, an oil chamber supplied with working oil, and so forth, and that is capable of fastening and unfastening the planetary carrier 34 of the first planetary gear mechanism 30 and the second sun gear 36b of the second planetary gear mechanism 35 to and from each other.

The brake B1 is a hydraulic brake (friction engagement element) that is structured as a band brake or a multi-plate friction-type brake including a hydraulic servo, and that is capable of holding the second sun gear 36b of the second planetary gear mechanism 35 stationary and cancelling such holding of the second sun gear 36b to the transmission case 22. The brake B2 is a hydraulic brake that is structured as a band brake or a multi-plate friction-type brake including a hydraulic servo, and that is capable of holding the planetary carrier 39 of the second planetary gear mechanism 35 stationary and cancelling such holding of the planetary carrier 39 to the transmission case 22. In addition, the one-way clutch F1 includes an inner race, an outer race, a plurality of sprags, and so forth, for example. The one-way clutch F1 transfers torque via the sprags when the outer race rotates in one direction with respect to the inner race, and allows the inner race and the outer race to rotate relative to each other when the outer race rotates in the other direction with respect to the inner race. It should be noted, however, that the one-way clutch F1 may be of a roller type or the like, other than the sprag type.

The clutches C1 to C4 and the brakes B1 and B2 operate with working oil supplied thereto and discharged therefrom by the hydraulic control device (not illustrated). FIG. 2 is an operation table that illustrates the relationship between each shift speed of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 has: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear (final drive gear) 44 formed on (or fixed to) the counter shaft 42; and a differential ring gear (final driven gear) 45 disposed below the drive pinion gear 44 (see FIG. 3) and meshed with the drive pinion gear 44. In the embodiment, the differential ring gear 45 is constituted as a helical gear.

Figure 5:
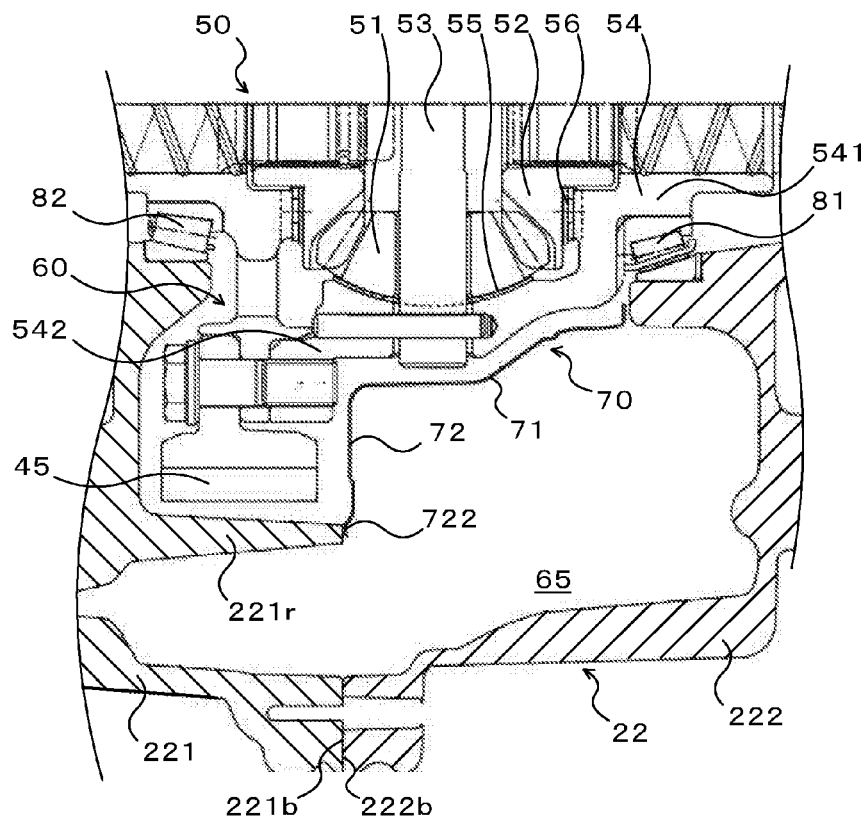
FIG. 5 is an explanatory diagram illustrating a sectional view taken along the line A-B in FIG. 4.
Figure 6:
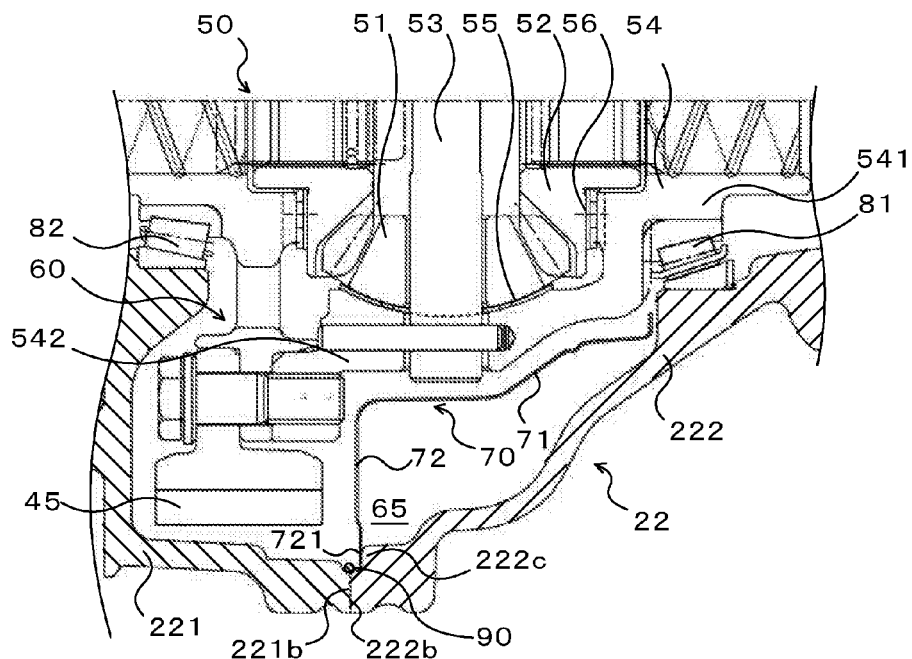
FIG. 6 is an explanatory diagram illustrating a sectional view taken along the line A-C in FIG. 4.

As illustrated in FIGS. 1, 5, and 6, the differential gear 50 includes a pair of (two) pinion gears 51, a pair of (two) side gears 52 each fixed to the drive shaft 28 and respectively meshed with the pair of pinion gears 51 at a right angle, a pinion shaft 53 that supports the pair of pinion gears 51, and a differential case 54 which houses the pair of pinion gears 51 and the pair of side gears 52 and to which the differential ring gear 45 discussed above is coupled (fixed). In the embodiment, the pinion gears 51 and the side gears 52 are each structured as a straight bevel gear. In addition, a pinion washer 55 is disposed between each of the pinion gears 51 and the differential case 54, and a side washer 56 is disposed between each of the side gears 52 and the differential case 54. The differential case 54 is rotatably supported by the transmission case 22 via bearings 81 and 82 coaxially with the drive shaft 28 (see FIGS. 5 to 7).

Subsequently, the structure around the differential ring gear 45 and the differential gear 50 in the transmission case 22 in the power transfer device 20 will be described with reference to FIGS. 3 to 12.

Figure 3:
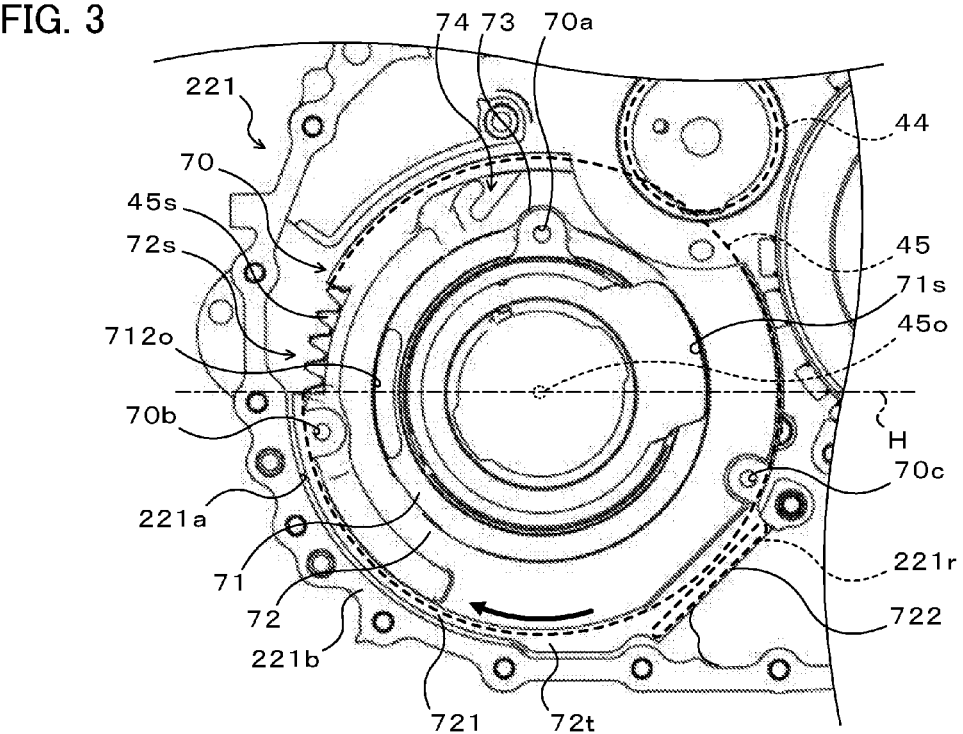
FIG. 3 is an explanatory diagram illustrating a state in which a reservoir plate 70 is disposed on a transaxle case 221.

In the embodiment, as illustrated in FIG. 3, the transaxle case 221 has an arc-shaped inner peripheral surface 221a formed to extend from the bottom portion along about one-fourth of the outer periphery of the differential ring gear 45 (see the broken line in FIG. 3). In addition, as illustrated in FIGS. 3 and 5, a rib portion 221r is formed at the lower part of the transaxle case 221. The rib portion 221r projects from a wall portion on the side (left side in FIG. 5) opposite to the converter housing 222 to a position that is about the same as an end surface 221b of the transaxle case 221 on the converter housing 222 side so as to cover, from below, a part of the differential ring gear 45 on the side (right side in FIG. 3) opposite to the inner peripheral surface 221a. The rib portion 221r is formed to extend linearly as inclined in the direction away from the inner peripheral surface 221a (rightward in FIG. 3) as the rib portion 221r extends upward from the vicinity of the bottom portion of the transaxle case 221.

Figure 4:
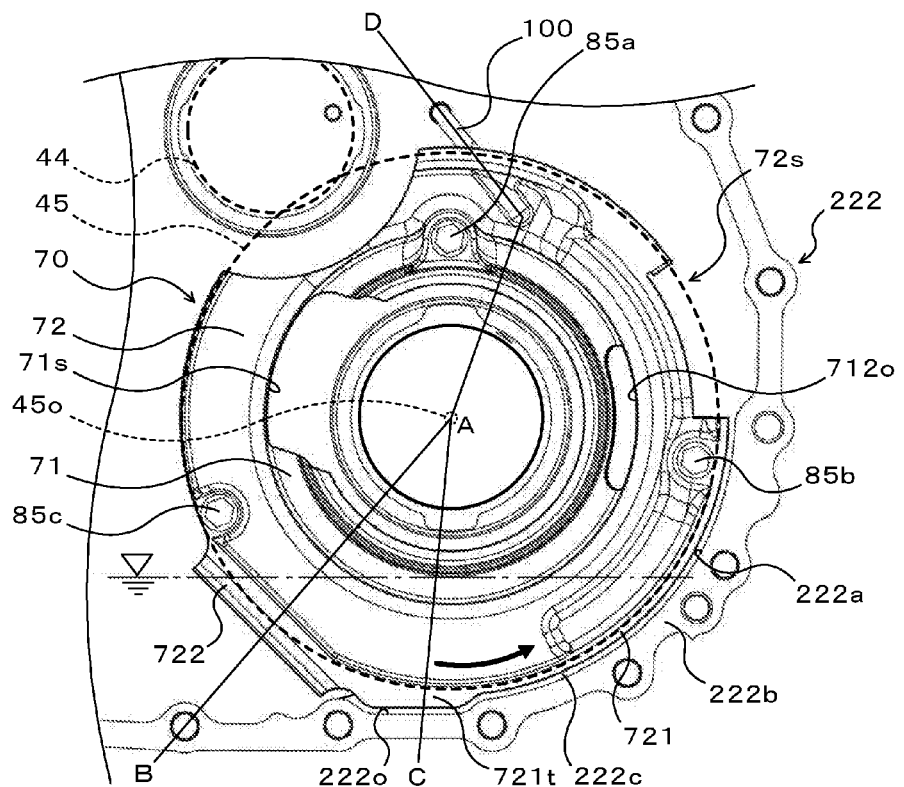
FIG. 4 is an explanatory diagram illustrating a state in which the reservoir plate 70 is attached to a converter housing 222.

As illustrated in FIG. 4, the converter housing 222 has an arc-shaped inner peripheral surface 222a formed to extend with a radius of curvature that is generally the same as that of the inner peripheral surface 221a at a position corresponding to the inner peripheral surface 221a of the transaxle case 221. It should be noted, however, that a recessed portion 222o that is dented toward the outer edge of the converter housing 222 is formed in a part of the inner peripheral surface 222a at the bottom portion of the converter housing 222. Further, as illustrated in FIGS. 4 and 6, the converter housing 222 has a stepped portion 222c formed to extend in an arc shape along the inner peripheral surface 222a, which includes a portion in which the recessed portion 222o is formed, and protrude toward the inside of the converter housing 222.

Figure 7:
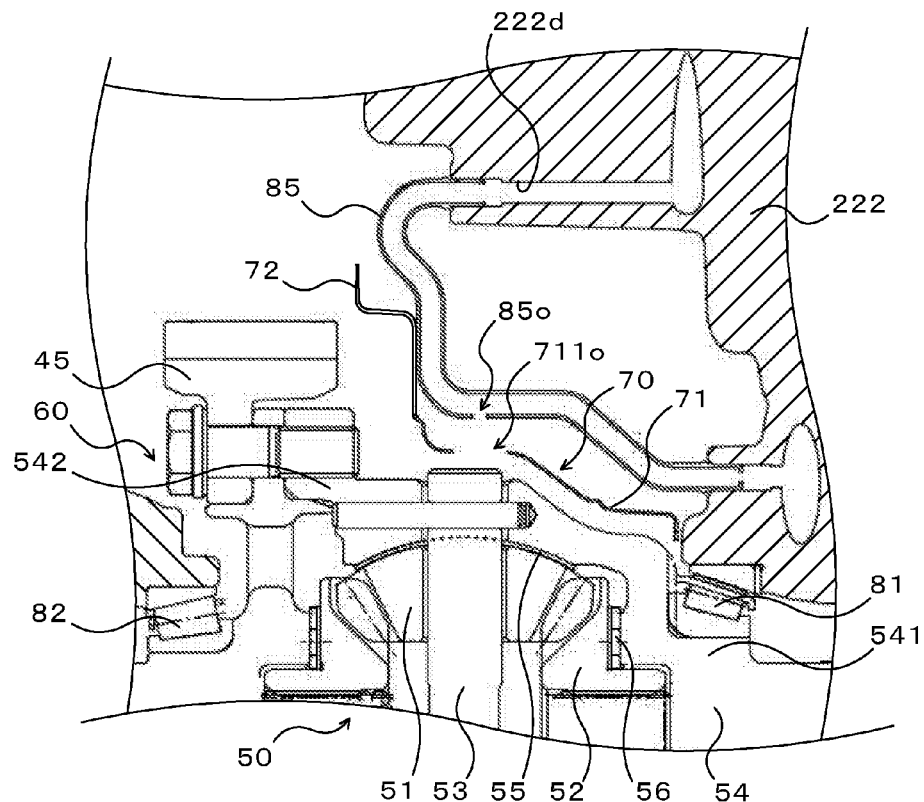
FIG. 7 is an explanatory diagram illustrating a sectional view taken along the line A-D in FIG. 4.

As illustrated in FIGS. 5 to 7, the transaxle case 221 and the converter housing 222 are fastened (coupled) to each other by a plurality of bolts (not illustrated) via a plurality of bolt holes formed in the end surface 221b of the transaxle case 221 and an end surface 222b of the converter housing 222 with the end surface 221b and the end surface 222b abutting against each other. In the embodiment, as illustrated in FIG. 6, a liquid seal member 90 is applied to the boundary between the end surface 221b of the transaxle case 221 and the end surface 222b of the converter housing 222. Consequently, leakage of working oil in the transmission case 22 to the outside through a gap between the end surface 221b and the end surface 222b is suppressed.

Figure 8:
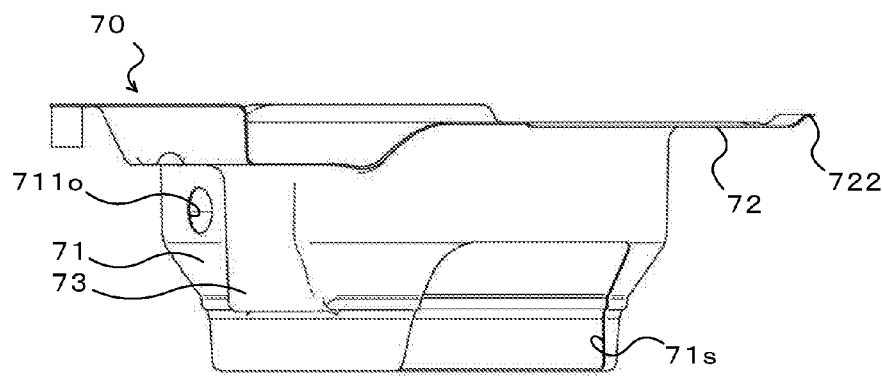
FIG. 8 is a view showing the outer appearance of the reservoir plate 70.
Figure 9:
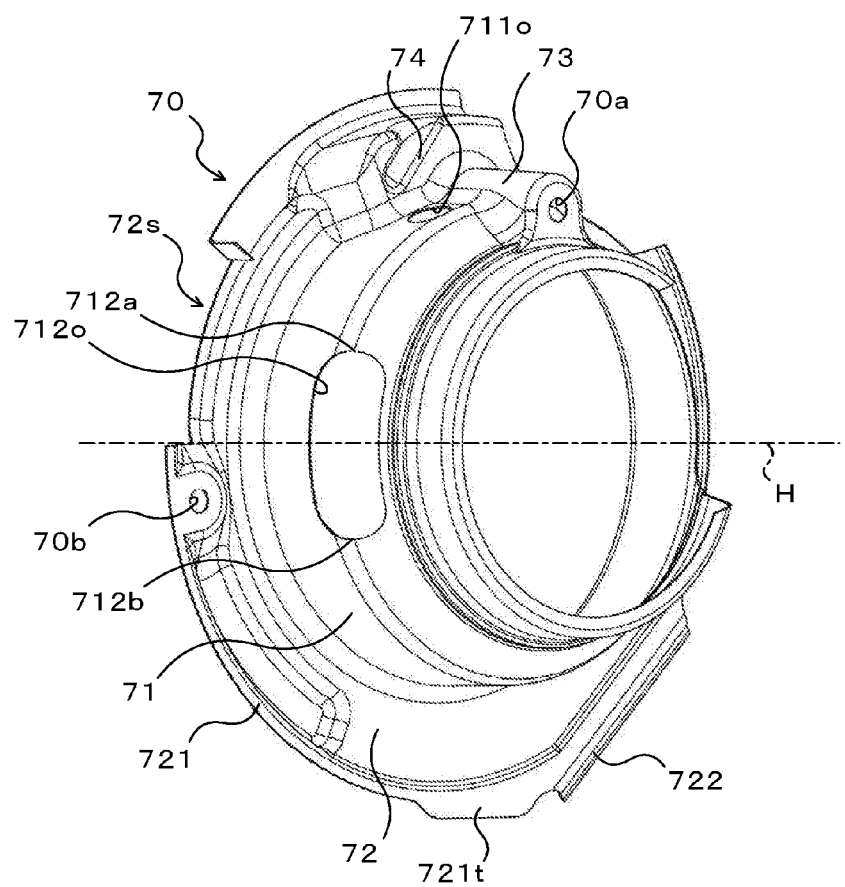
FIG. 9 is a view showing the outer appearance of the reservoir plate 70.
Figure 10:
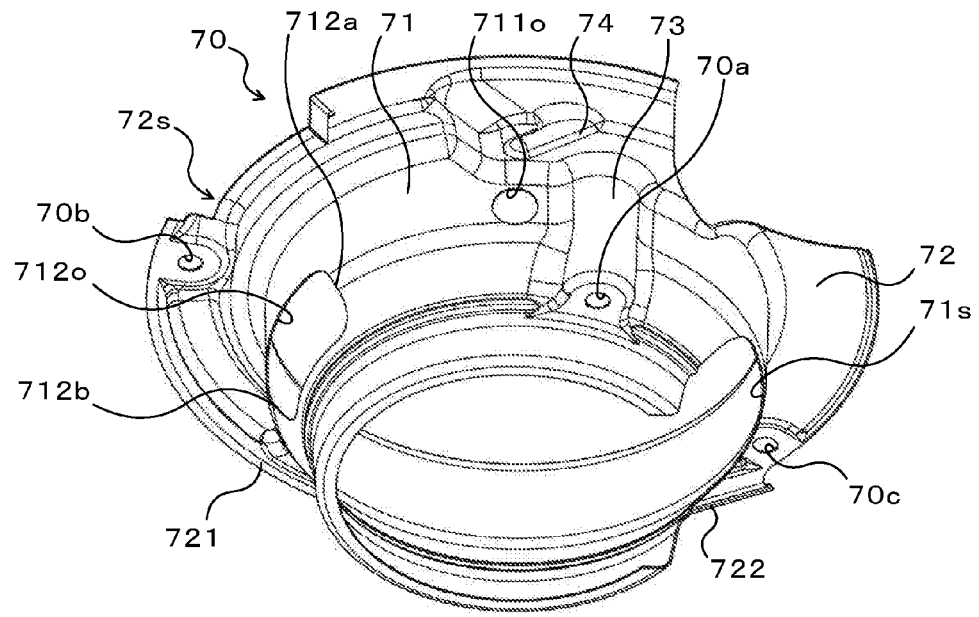
FIG. 10 is a view showing the outer appearance of the reservoir plate 70.

A space inside the transmission case 22 which includes the transaxle case 221 and the converter housing 222 which are configured as discussed above is partitioned by a reservoir plate (partitioning member) 70 illustrated in FIGS. 8 to 10 into a differential chamber 60, in which the differential ring gear 45 and the differential gear 50 are disposed, and the working oil storage chamber 65, in which working oil is stored. As illustrated in FIGS. 8 to 10, the reservoir plate 70 includes a tubular portion 71 formed in a generally cylindrical shape, and a flange portion 72 extended radially outward from one end of the tubular portion 71 into a generally arc shape. In the embodiment, the reservoir plate 70 which is constituted from the tubular portion 71 and the flange portion 72 is formed by pressing a metal material such as iron. It should be noted, however, that the reservoir plate 70 may be formed by injection molding or the like using a resin material.

As illustrated in FIGS. 5 to 7, the tubular portion 71 is formed to extend along a part of the outer peripheral surface of the differential case 54 of the differential gear 50 with the reservoir plate 70 attached to the transmission case 22, and mainly surrounds a portion of the differential case 54 excluding a support portion 541, which is supported via the bearing 81 by the converter housing 222, and a differential ring gear attachment portion 542, to which the differential ring gear 45 is coupled. It should be noted, however, that the tubular portion 71 is provided with a notched portion 71s as illustrated in FIGS. 8 to 10. The notched portion 71s is provided so as to avoid interference between the tubular portion 71 and the converter housing 222. In addition, a fixing portion 73 in which a bolt hole 70a is formed is provided at the upper part of the tubular portion 71. Further, the tubular portion 71 has an opening portion 711o that opens at a side of the fixing portion 73.

As illustrated in FIGS. 3 to 7, the flange portion 72 is formed facing an end surface of the differential ring gear 45 on the converter housing 222 side with the reservoir plate 70 attached to the transmission case 22. As illustrated in FIGS. 3, 9, and 10, the flange portion 72 is provided with bolt holes 70b and 70c. As illustrated in FIG. 4, the reservoir plate 70 is fastened to the converter housing 222 by a plurality of bolts 85a to 85c via the bolt hole 70a which is formed in the tubular portion 71 and the bolt holes 70b and 70c.

As illustrated in FIG. 4, the flange portion 72 is provided with a first seal portion 721 that has an arc-shaped outer edge that extends along the inner peripheral surface 222a of the converter housing 222 with a radius of curvature that is slightly smaller than that of the inner peripheral surface 222a. It should be noted, however, that a projecting portion 721t that projects radially outward is formed on a part of the first seal portion 721 as illustrated in FIGS. 4 and 9. As illustrated in FIG. 6, the first seal portion 721 is formed such that a surface on the converter housing 222 side can abut against the stepped portion 222c of the converter housing 222 with the reservoir plate 70 attached to the transmission case 22. Consequently, a gap between the first seal portion 721 and the stepped portion 222c can be sealed well by causing the first seal portion 721 to tightly contact the stepped portion 222c as the reservoir plate 70 is fastened to the converter housing 222.

In addition, as illustrated in FIG. 4, the projecting portion 721t is extended from the first seal portion 721 so as to be insertable into the recessed portion 222o, which is formed in the inner peripheral surface 222a of the converter housing 222, with a slight clearance. Consequently, the reservoir plate 70 can be easily fastened to the converter housing 222 by stably positioning the reservoir plate 70 with respect to the converter housing 222 by inserting the projecting portion 721t into the recessed portion 222o.

Further, as illustrated in FIG. 3, the flange portion 72 is provided with a second seal portion 722 formed at a position corresponding to the rib portion 221r, which is formed on the transaxle case 221, to extend linearly from below to above as inclined at an angle that is generally the same as that of the rib portion 221r. The second seal portion 722 is formed so as to project toward the transaxle case 221 (leftward in FIG. 5) slightly more than the end surface 222b of the converter housing 222 when the reservoir plate 70 is fastened to the converter housing 222. Consequently, when the transaxle case 221 and the converter housing 222 are fastened to each other by a plurality of bolts, as illustrated in FIG. 5, the second seal portion 722 is pressed toward the converter housing 222 by the rib portion 221r to be elastically deformed. That is, the second seal portion 722 of the flange portion 72 can be elastically pressed against the rib portion 221r when the reservoir plate 70 and the transmission case 22 are assembled to each other. As a result, it is possible to seal a gap between the second seal portion 722 of the flange portion 72 and the rib portion 221r well.

In this way, by sealing the gap between the first seal portion 721 of the flange portion 72 and the stepped portion 222c of the converter housing 222 and the gap between the second seal portion 722 of the flange portion 72 and the rib portion 221r of the transaxle case 221, the inside of the transmission case 22 is partitioned into the differential chamber 60 and the working oil storage chamber 65 by the reservoir plate 70. As illustrated in FIGS. 3 and 4, a slight clearance is present between the first seal portion 721 (projecting portion 721t) and the second seal portion 722 of the flange portion 72. However, at least a part of the clearance is filled with the liquid seal member 90 discussed above. Consequently, an inflow of working oil in the working oil storage chamber 65 into the differential chamber 60 via the clearance can be suppressed.

Subsequently, the structure for supplying working oil that serves as lubricating and cooling oil to the differential gear 50, which is partially surrounded by the tubular portion 71 of the reservoir plate 70, will be described. As illustrated in FIGS. 4 and 7, the power transfer device 20 has a working oil supply pipe 100 disposed above the tubular portion 71 of the reservoir plate 70 in the converter housing 222 and connected to a hydraulic circuit of a lubrication system of a hydraulic control device (not illustrated) via an oil passage 222d formed in the converter housing 222.

In the embodiment, as illustrated in FIGS. 9 and 10, the upper part of the flange portion 72 of the reservoir plate 70 is provided with a holding portion 74 that has the shape of a groove that extends along a part of the working oil supply pipe 100. The working oil supply pipe 100 is attached to the converter housing 222 such that a part of the working oil supply pipe 100 is fitted in the holding portion 74. Consequently, the working oil supply pipe 100 can be stably attached and fixed to the converter housing 222 without separately providing a fixing member or a support member. As illustrated in FIG. 7, the working oil supply pipe 100 is provided with a supply hole 100o that opens above the opening portion 711o which is formed in the tubular portion 71 of the reservoir plate 70. Consequently, working oil that has flowed out from the supply hole 100o of the working oil supply pipe 100 can be caused to flow into the differential chamber 60 via the opening portion 711o of the tubular portion 71.

Figure 11:
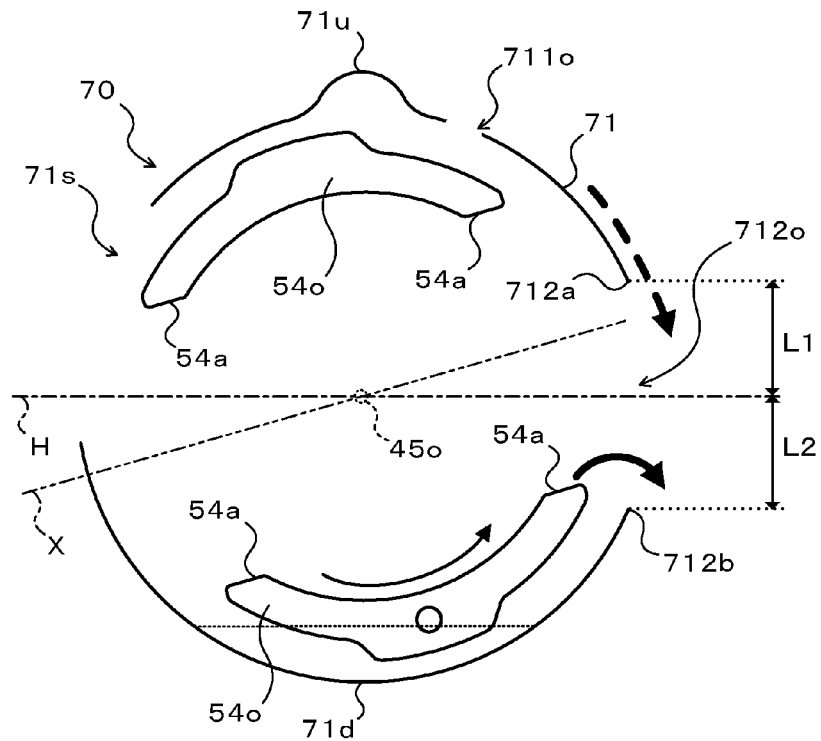
FIG. 11 is an explanatory diagram illustrating a cross-sectional view of a tubular portion 71 of the reservoir plate 70 and a differential case 54.
Figure 12:
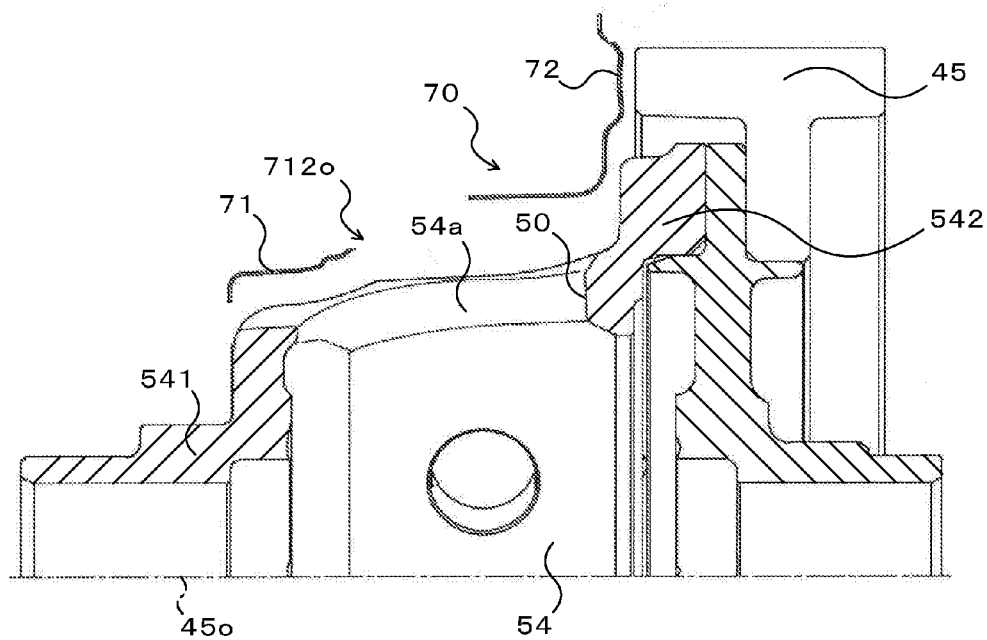
FIG. 12 is an explanatory diagram illustrating a sectional view of the reservoir plate 70, a differential gear 50, and a differential ring gear 45 taken along a horizontal plane H that includes a rotational axis 45o of the differential ring gear 45 illustrated in FIG. 11.

FIG. 11 is an explanatory diagram illustrating a cross-sectional view of the tubular portion 71 of the reservoir plate 70 and the differential case 54. FIG. 12 is an explanatory diagram illustrating a sectional view of the reservoir plate 70, the differential gear 50, and the differential ring gear 45 taken along a horizontal plane H that includes a rotational axis 45o of the differential ring gear 45 illustrated in FIG. 11. It should be noted, however, that the constituent elements of the differential gear 50 other than the differential case 54 are not illustrated in FIG. 11. As illustrated in FIG. 11, the differential case 54 has a pair of openings 54o formed facing each other on an axis X that is orthogonal to the rotational axis 45o of the differential ring gear 45. In the embodiment, the pair of openings 54o have the same shape as each other, and have edge portions 54a formed in a generally quadrangular shape on a portion of the differential case 54 other than the support portion 541 and the differential ring gear attachment portion 542 to extend between the support portion 541 and the differential ring gear attachment portion 542 as illustrated in FIG. 12. In addition, as illustrated in FIG. 11, the pair of openings 54o are formed such that the distance from the axis X to the edge portion 54a on the upper side in the drawing and the distance from the axis X to the edge portion 54a on the lower side in the drawing which faces the edge portion 54a on the upper side are generally equal to each other.

In this way, the pair of openings 54o which face each other on the axis X which is orthogonal to the rotational axis 45o of the differential ring gear 45 face the opening portion 711o of the tubular portion 71 when the differential case 54 is rotated about the rotational axis 45o together with the differential ring gear 45. Consequently, working oil that has flowed out from the supply hole 100o of the working oil supply pipe 100 to flow into the differential chamber 60 via the opening portion 711o of the tubular portion 71 can be taken into the differential case 54 from the pair of openings 54o. As a result, working oil that serves as lubricating and cooling oil can be supplied to the pinion gears 51, the side gears 52, the pinion shaft 53, the pinion washers 55, and the side washers 56 which are disposed in the differential case 54. The pair of openings 54o may be used as working hole portions when assembling the pinion gears 51, the side gears 52, and so forth in the differential case 54.

Working oil supplied into the differential case 54 and used to lubricate and cool the constituent elements of the differential gear 50 as discussed above mainly flows down into the tubular portion 71 of the reservoir plate 70, and a part of the working oil flows into a space around the differential ring gear 45 along the inner peripheral surface of the tubular portion 71 and a surface of the flange portion 72. In addition, working oil that has been used to lubricate and cool a meshing portion between the drive pinion gear 44 and the differential ring gear 45 etc. also flows down to a space around the differential ring gear 45. When such working oil resides around the differential ring gear 45, the rotational resistance of the differential ring gear 45 (stirring resistance) may be increased to incur a reduction in fuel efficiency of the vehicle on which the power transfer device 20 is mounted. Therefore, in the power transfer device 20 according to the embodiment, the following configuration is adopted to suppress residence of working oil around the differential ring gear 45.

In the embodiment, as illustrated in FIGS. 3, 9, and 10, the flange portion 72 of the reservoir plate 70 has a notched portion 72s formed so as to expose some of teeth 45s (see FIG. 3) of the differential ring gear 45 as seen from the converter housing 222 side. As illustrated in FIG. 3, the notched portion 72s is formed on the side in the travel direction, in a main rotational direction R of the differential ring gear 45 (a direction in which the differential ring gear 45 is rotated when the vehicle on which the power transfer device 20 is mounted travels forward; see the solid arrows in FIGS. 3 and 4), with respect to the horizontal plane H which includes the rotational axis 45o of the differential ring gear 45.

As discussed above, the differential ring gear 45 according to the embodiment is constituted as a helical gear, and the tooth ridges of the differential ring gear 45 are inclined in a direction delayed with respect to the main rotational direction R from the differential chamber 60 side toward the working oil storage chamber 65. That is, the differential ring gear 45 is disposed in the transmission case 22 so as to rake up working oil that resides around the differential ring gear 45 in the differential chamber 60 obliquely toward the working oil storage chamber 65 (toward the flange portion 72) when the differential ring gear 45 is rotated in the main rotational direction R. Consequently, working oil that resides around the differential ring gear 45 and that has been raked up along with rotation of the differential ring gear 45 can be discharged well to the working oil storage chamber 65 via the notched portion 72s of the flange portion 72. As a result, residence of working oil around the differential ring gear 45 can be suppressed well, and the rotational resistance of the differential ring gear 45 (stirring resistance) can be further reduced to improve the fuel efficiency of the vehicle on which the power transfer device 20 is mounted.

In the embodiment, further, as illustrated in FIGS. 9 to 12, the tubular portion 71 of the reservoir plate 70 has a discharge hole 712o that opens on the side in the travel direction, in the main rotational direction R of the differential ring gear 45 (see the thin solid arrow indicated in FIG. 11), with respect to a lowermost point 71d (see FIG. 11) of the tubular portion 71 and on the opposite side of an uppermost point 71u (see FIG. 11) of the tubular portion 71 from the travel direction side in the main rotational direction R. The "lowermost point 71d" and the "uppermost point 71u" of the tubular portion 71 indicate the lowermost portion and the uppermost portion, respectively, of the tubular portion 71 at a position, in the axial direction, at which the discharge hole 712o is formed. As illustrated in FIG. 11, the discharge hole 712o is formed at generally the middle portion, in the axial direction, of the tubular portion 71 so as to be able to face the pair of openings 54o (so as to be arranged on the axis X which is orthogonal to the rotational axis 45o), which are formed in the differential case 54, when the differential case 54 is rotated about the rotational axis 45o together with the differential ring gear 45.

In the embodiment, in addition, as illustrated in FIGS. 9 and 11, the discharge hole 712o is formed to have the shape of an elongated hole that is vertically symmetric with respect to the horizontal plane H which includes the rotational axis 45o of the differential ring gear 45. That is, as illustrated in FIG. 11, the discharge hole 712o is formed such that a distance L1 from the horizontal plane H to an upper end 712a and a distance L2 from the horizontal plane H to a lower end 712b are equal to each other. It should be noted, however, that the lower end 712b of the discharge hole 712o is formed so as to be positioned above at least an oil surface of working oil in the working oil storage chamber 65 (an oil surface at the time when the vehicle on which the power transfer device 20 is mounted is traveling or stationary on a flat road; see the dash-and-dot line in FIG. 4, for example).

Consequently, when the differential ring gear 45 and the differential case 54 are rotated in the main rotational direction R about the rotational axis 45o, as indicated by the thick solid arrow in FIG. 11, working oil that resides in the lower part of the tubular portion 71 (see the broken line in FIG. 11, for example) is mainly raked up by the edge portion 54a of the pair of openings 54o of the differential case 54 to be discharged to the working oil storage chamber 65 from the discharge hole 712o of the tubular portion 71 which is formed so as to be able to face the pair of openings 54o. In addition, working oil that resides in the lower part of the tubular portion 71 and that has been raked up by the recessed and projected shape of the outer peripheral surface of the differential case 54 and also working oil that has been used to lubricate the constituent elements of the differential gear 50 and splashed from the inside of the differential case 54 toward the discharge hole 712o directly by the action of a centrifugal force are discharged to the working oil storage chamber 65 via the discharge hole 712o.

In this way, in the power transfer device 20 according to the embodiment, working oil around the differential gear 50 which is not raked out to the outside of the differential chamber 60 by the differential ring gear 45, that is, working oil that resides at the lower part of the tubular portion 71 of the reservoir plate 70, can also be discharged to the working oil storage chamber 65 via the discharge hole 712o of the tubular portion 71, and therefore the performance of discharging working oil in the differential chamber 60 can be further improved. As a result, it is possible to suppress working oil that resides at the lower part of the tubular portion 71 flowing down to a space around the differential ring gear 45 along the inner peripheral surface of the tubular portion 71 and a surface of the flange portion 72, and to suppress an increase in rotational resistance of the differential ring gear 45 (stirring resistance) better.

In addition, by forming the discharge hole 712o so as to have the shape of an elongated hole that is vertically symmetric with respect to the horizontal plane H which includes the rotational axis 45o of the differential ring gear 45, it is possible to prevent the opening range of the discharge hole 712o from being excessively leaned to one of the upper and lower sides, and to prevent only the upper part, or only the lower part, of the discharge hole 712o from opening widely, while securing the opening area of the discharge hole 712o well. As a result, it is possible to suppress, better, working oil that has flowed down from the upper part of the tubular portion 71 (see the thick broken arrow in FIG. 11), and working oil in the working oil storage chamber 65, flowing into the differential chamber 60 (inside the tubular portion 71) via the discharge hole 712o while allowing working oil in the differential chamber 60 (inside the tubular portion 71) to flow out into the working oil storage chamber 65 from the discharge hole 712o well.

It should be noted, however, that the discharge hole 712o may be formed to have a shape other than an elongated hole, such as a circle and a square. Also in this case, by forming the discharge hole 712o such that the distance L1 from the horizontal plane H which includes the rotational axis 45o of the differential ring gear 45 to the upper end 712a and the distance L2 from the horizontal plane H to the lower end 712b are equal to each other, it is possible to prevent the opening range of the discharge hole 712o from being excessively leaned to one of the upper and lower sides while securing the length (opening area) of the discharge hole 712o well. Further, the discharge hole 712o may be formed such that the distance L1 from the horizontal plane H to the upper end 712a and the distance L2 from the horizontal plane H to the lower end 712b are different from each other, and may be formed to have a shape that is vertically asymmetric with respect to the horizontal plane H. In this case, in order to suppress working oil that has flowed down from the upper part of the tubular portion 71 flowing into the differential chamber 60, the opening area of the discharge hole 712o on the upper side with respect to the horizontal plane H is preferably smaller than the opening area of the discharge hole 712o on the lower side with respect to the horizontal plane H.

As has been described above, the present disclosure provides a power transfer device including: a differential ring gear meshed with a drive pinion gear to which power from a transmission is transferred; a differential gear that includes a differential case coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein: the differential case has a pair of openings formed facing each other on an axis that is orthogonal to a rotational axis of the differential ring gear; the partitioning member includes a tubular portion formed so as to surround a part of the differential case; the tubular portion has a discharge port that opens on a side in a travel direction, in a main rotational direction of the differential ring gear and the differential case, with respect to a lowermost point of the tubular portion and on an opposite side of an uppermost point of the tubular portion from the travel direction side in the main rotational direction; and the discharge port is formed in the tubular portion so as to be able to face the pair of openings as the differential case is rotated about the rotational axis.

In the power transfer device thus configured, working oil around the differential gear in the differential chamber (inside the tubular portion) is mainly raked up by the edges of the pair of openings which are formed in the differential case, as the differential ring gear and the differential case are rotated, to be discharged to the working oil storage chamber from the discharge port which is formed in the tubular portion of the partitioning member. In this way, with the power transfer device, working oil around the differential gear, which is not raked out to the outside of the differential chamber by the differential ring gear, can be discharged to the working oil storage chamber via the discharge port of the tubular portion of the partitioning member. Thus, with the power transfer device, it is possible to further improve the performance of discharging working oil in the differential chamber which is defined by the partitioning member. The phrase "main rotational direction of the differential ring gear" may refer to the rotational direction of the differential ring gear at the time when a vehicle on which the power transfer device is mounted travels forward.

The discharge port may be formed such that a distance from a horizontal plane that includes the rotational axis to an upper end and a distance from the horizontal plane to a lower end are equal to each other. Consequently, an inflow of working oil that has flowed down from the upper part of the tubular portion and working oil in the working oil storage chamber into the differential chamber via the discharge port can be suppressed better by preventing the opening range of the discharge port from being excessively leaned to one of the upper and lower sides while allowing working oil in the differential chamber to flow out into the working oil storage chamber from the discharge port well by securing the opening area of the discharge port well.

The discharge port may have a shape that is vertically symmetric with respect to the horizontal plane. Consequently, an inflow of working oil that has flowed down from the upper part of the tubular portion and working oil in the working oil storage chamber into the differential chamber via the discharge port can be suppressed better while allowing working oil in the differential chamber to flow out into the working oil storage chamber from the discharge port well.

An opening portion that allows working oil to flow into the case may be formed in an upper part of the tubular portion. Consequently, it is possible to allow working oil for lubrication and cooling to flow into the case via the opening portion of the tubular portion, and to allow working oil that has been used for lubrication and cooling in the case to flow out from the discharge hole of the tubular portion.

The present disclosure is not limited to the embodiment described above in any way, and it is a matter of course that the present disclosure may be modified in various ways within the broad scope of the present disclosure. Further, the mode for carrying out the disclosure described above is merely a specific form of the disclosure described in the "SUMMARY" section, and does not limit the elements of the invention described in the "SUMMARY" section.

INDUSTRIAL APPLICABILITY

The present disclosure is applicable to, for example the power transfer device manufacturing industry etc.

The invention claimed is:

1. A power transfer device comprising: a differential ring gear meshed with a drive pinion gear to which power from a transmission is transferred; a differential gear that includes a differential case coupled to the differential ring gear; a case that houses the differential ring gear and the differential gear; and a partitioning member that partitions a space in the case into a differential chamber, in which the differential ring gear and the differential gear are disposed, and a working oil storage chamber, in which working oil is stored, wherein:

the differential case has a pair of openings formed facing each other on an axis that is orthogonal to a rotational axis of the differential ring gear;

the partitioning member includes a tubular portion formed so as to surround a part of the differential case;

the tubular portion has a discharge port that opens on a side in a travel direction, in a main rotational direction of the differential ring gear and the differential case, with respect to a lowermost point of the tubular portion and on an opposite side of an uppermost point of the tubular portion from the travel direction side in the main rotational direction; and the discharge port is formed in the tubular portion so as to be able to face the pair of openings as the differential case is rotated about the rotational axis.

2. The power transfer device according to claim 1, wherein the discharge port is formed such that a distance from a horizontal plane that includes the rotational axis to an upper end and a distance from the horizontal plane to a lower end are equal to each other.

3. The power transfer device according to claim 2, wherein the discharge port has a shape that is vertically symmetric with respect to the horizontal plane.

4. The power transfer device according to claim 3, wherein an opening portion that allows working oil to flow into the case is formed in an upper part of the tubular portion.

5. The power transfer device according to claim 1, wherein an opening portion that allows working oil to flow into the case is formed in an upper part of the tubular portion.

6. The power transfer device according to claim 2, wherein an opening portion that allows working oil to flow into the case is formed in an upper part of the tubular portion.

* * * * *